June 21, 1960 H. J. TISCHLER ET AL 2,941,583
RECLINING SEAT
Filed Sept. 5, 1957 5 Sheets-Sheet 1

INVENTORS
HENRY J. TISCHLER & ANTHONY CIESIELSKI
BY
*Barnes, Kisselle, Raisch & Choate*
ATTORNEYS June 21, 1960 H. J. TISCHLER ET AL 2,941,583
RECLINING SEAT
Filed Sept. 5, 1957
5 Sheets-Sheet 2

INVENTORS
HENRY J. TISCHLER & ANTHONY CIESIELSKI
BY
Barnes, Kisselle, Raisch & Choate
ATTORNEYS June 21, 1960

H. J. TISCHLER ET AL 2,941,583

RECLINING SEAT

Filed Sept. 5, 1957

INVENTORS
HENRY J. TISCHLER & ANTHONY CIESIELSKI
BY
Barnes, Kisselle, Raisch & Choate
ATTORNEYS INVENTORS
HENRY J. TISCHLER &
ANTHONY CIESIELSKI
BY
*Barnes, Kisselle, Raisch & Choate*
ATTORNEYS

INVENTORS
HENRY J. TISCHLER & ANTHONY CIESIELSKI

United States Patent Office
2,941,583
Patented June 21, 1960

2,941,583

RECLINING SEAT

Henry J. Tischler, Huntington Woods, and Anthony Ciesielski, Detroit, Mich., assignors to L. A. Young Spring & Wire Corporation, Madison Heights, Mich., a corporation of Michigan Filed Sept. 5, 1957, Ser. No. 682,114

18 Claims. (Cl. 155—160)

This invention relates to seats for automobiles and particularly to reclining seats.

Automobile manufacturers have recently found a customer demand for a front automobile seat which has the back divided into two sections, each section being adjustable to a plurality of reclining positions.

In one type of adjusting mechanism which is currently used for each back section, a plurality of rods, latches and other associated parts are exposed to the exterior of the seat. Moreover such a mechanism requires a great number of parts.

It is an object of this invention to provide a reclining seat which will obviate the aforementioned disadvantages. The reclining seat embodying the invention has a single mechanism at one end of each section of the back which serves the combined function of hinging the back section to the seat and, in addition, providing an adjusting mechanism.

It is a further object of this invention to provide a reclining seat having an adjusting mechanism which requires only one movement for each increment of lowering the seat back.

It is a further object of this invention to provide a reclining seat having an adjusting mechanism which is low in cost.

Figure 1:
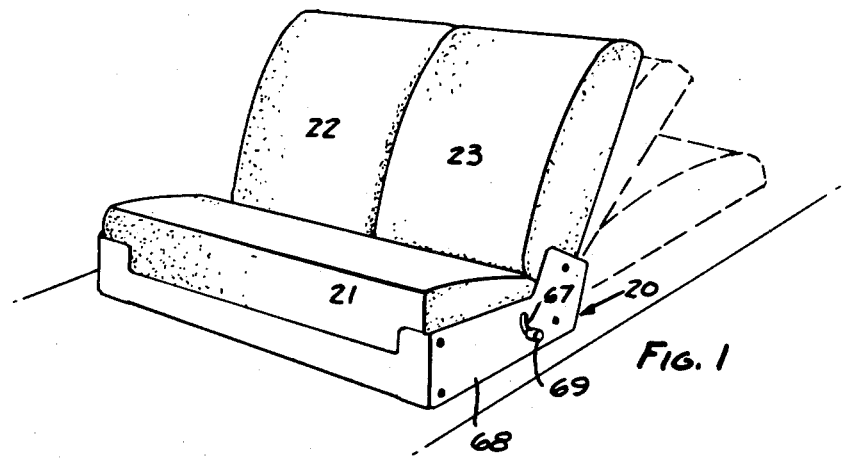
Fig. 1 is a perspective view of a reclining seat embodying the invention.
Figure 4:
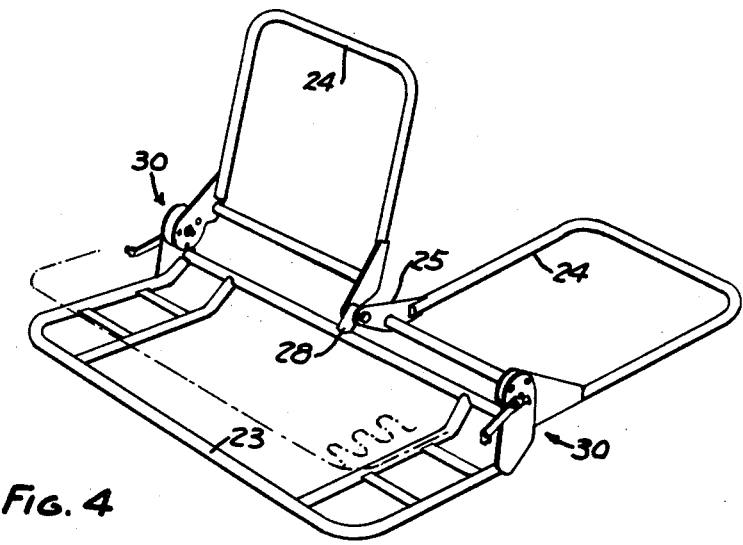
Fig. 4 is a perspective view of the frame construction for the reclining seat shown in Fig. 1.

Referring to Fig. 1, a seat 20 represents a front seat of an automobile which includes a seat cushion 21 and a back cushion comprising two sections 22 mounted for hinging movement relative to the seat cushion 21. As shown in Fig. 4 the frame for the reclining seat is made of tubular members and includes a seat frame 23 for supporting the seat cushion and back frames 24 for supporting the back cushions.

Figures 9, 10:
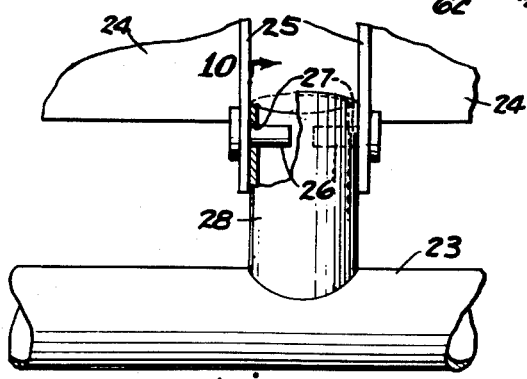
Fig. 9 is a fragmentary view of the central portion of the frame shown in Fig. 4 taken from the rear of the frame, parts being broken away.
Fig. 10 is a fragmentary sectional view taken along the line 10—10 in Fig. 9, parts being broken away.

Each back frame 24 includes a bracket 25 at the lower end of the inner side thereof having a generally horizontal pin 26 thereon which projects into an opening 27 on a tubular upright 28 extending upwardly from the frame 23 (Figs. 9 and 10). By this arrangement the inner side of each back frame 24 is hinged at its lower edge to the seat frame 23. The outer side of each frame 24 is hinged at its lower edge to the seat frame by an adjusting mechanism 30.

Figure 5:
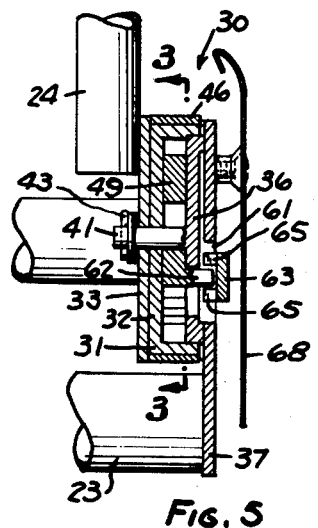
Fig. 5 is a fragmentary sectional view taken along the line 5—5 in Fig. 2.
Figure 8:
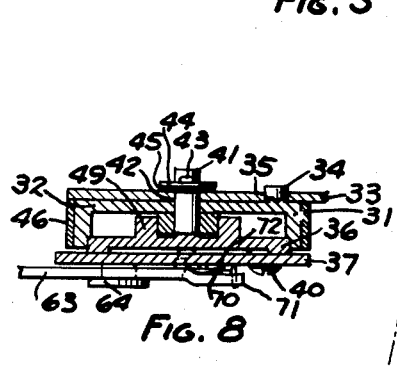
Fig. 8 is a fragmentary sectional view taken along the line 8—8 in Fig. 6.
Figure 7:
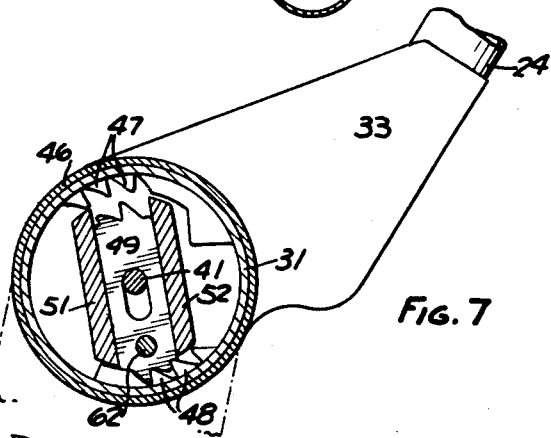
Fig. 7 is a fragmentary sectional view similar to Fig. 6, showing the parts in a differently adjusted position.
Figure 13:
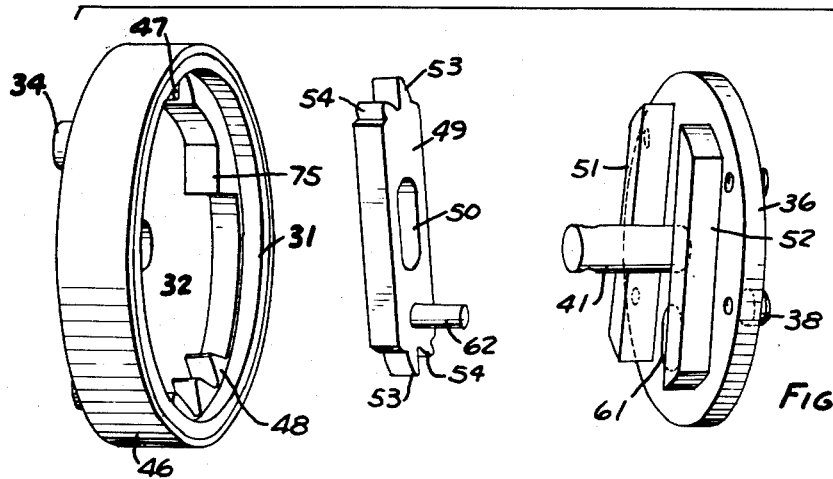
Fig. 13 is an exploded perspective view of some of the parts of the seat-adjusting mechanism.
Figure 14:
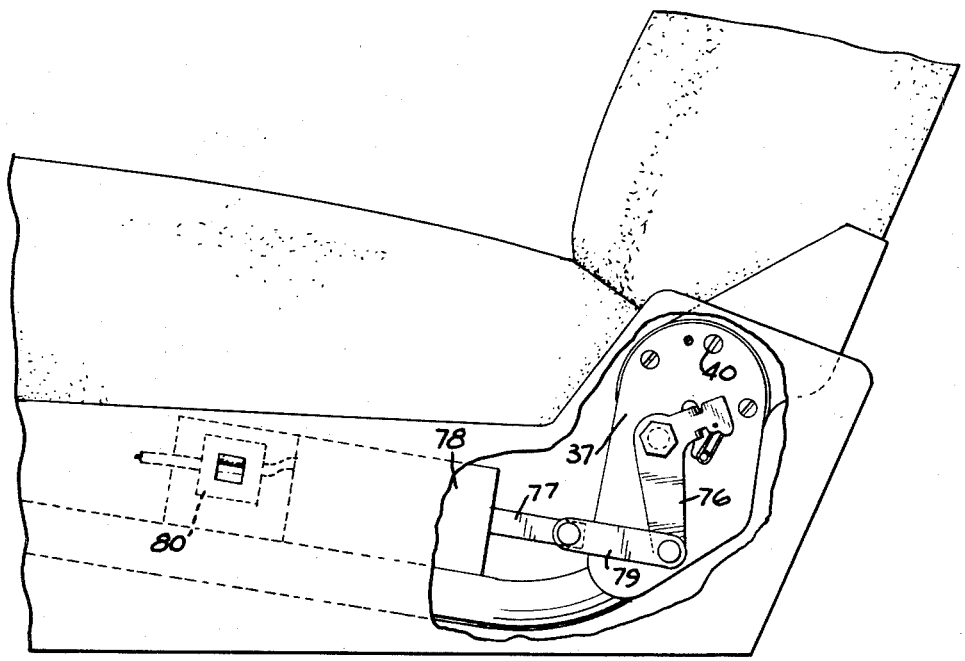
Fig. 14 is a fragmentary side elevational view showing a modified form of the invention.

As shown in Figs. 4, 5 and 8 adjusting mechanism 30 includes a cylindrical casing 31 having a closed end wall 32 non-rotatably mounted on a flat upright bracket 33 on the back frame 24 by means of lugs 34 projecting through openings 35 in bracket 33. The inner periphery of cylindrical casing 31 bears against the periphery of a circular bearing plate 36 to form the pivot for the back frame 24 to the seat frame 23. Bearing plate 36 is fixed to a flat upright bracket 37 by means which includes circumferentially spaced projections 38 passing through openings 39 in bracket 37 and screws 40 threaded into projections 38 (Figs. 13 and 14). Bracket 37 is fixed on frame 23.

As shown in Figs. 5 and 8 bearing plate 36 includes a centrally located pin 41 which extends axially through the center of wall 32 of cylindrical casing 31 and through an opening 42 in bracket 33. The bearing plate and cylindrical casing are held in assembled relation by a cotter pin 43 which holds a flat washer 44 against the spring washer 45 which, in turn, is compressed against the outer surface of bracket 33. Cylindrical casing 31 is reinforced by a ring 46 press fitted or shrunk on the outer periphery of the cylindrical casing.

Figure 3:
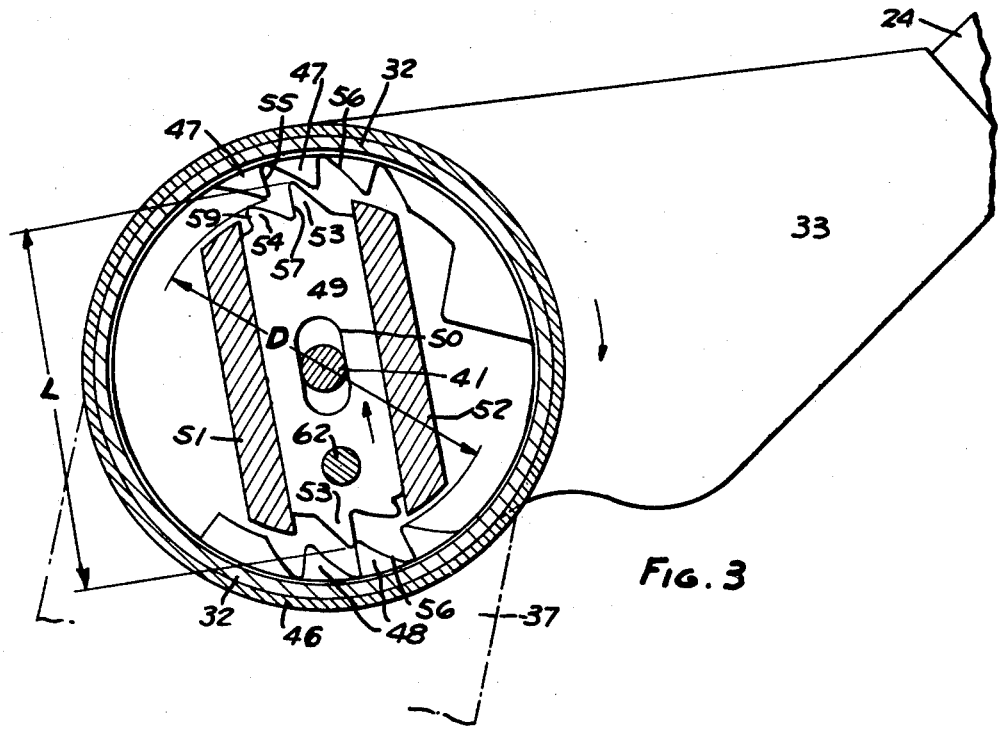
Fig. 3 is a fragmentary sectional view on an enlarged scale taken along the line 3—3 in Fig. 5.

Referring to Fig. 3, cylindrical casing 31 is formed with two diametrically opposed sets of teeth 47, 48 which lie on opposite sides of pin 41. The apexes of teeth 47, 48 lie on a common circle having a diameter D. The apexes of teeth 47 are staggered slightly circumferentially relative to the apexes of teeth 48. A pawl 49 is positioned within cylindrical casing 31 for reciprocating movement between the sets of teeth 47, 48. Pawl 49 includes an opening 50 surrounding pin 41 and elongated in the direction of movement of pawl 49. The reciprocating movement of pawl 49 is guided by spaced rails 51, 52 which are formed integrally with bearing plate 36. Pawl 49 is formed on each end thereof with a locking tooth 53 and an auxiliary tooth 54.

As further shown in Fig. 3 the length L of pawl 49 measured in a direction parallel to the line of reciprocating movement of pawl 49 is greater than the diameter D of the circle in which the apexes of the sets of teeth 47, 48 lie. By this construction when the pawl 49 is moved away from one set of teeth and toward the other set of teeth, one of the teeth 53 is in position for engagement with the teeth toward which the pawl is moved before the opposite tooth 53 moves out of engagement with the teeth away from which the pawl is moving. For example, as shown in Fig. 3 when the pawl is moved upwardly in the direction of the arrow, the lower tooth 53 is still in engagement with tooth 48 when the upper tooth 53 has moved into the space between teeth 47. By this arrangement as the pawl 49 is reciprocated a step-by-step adjustment of the back frame relative to the seat frame is insured.

Figure 12:
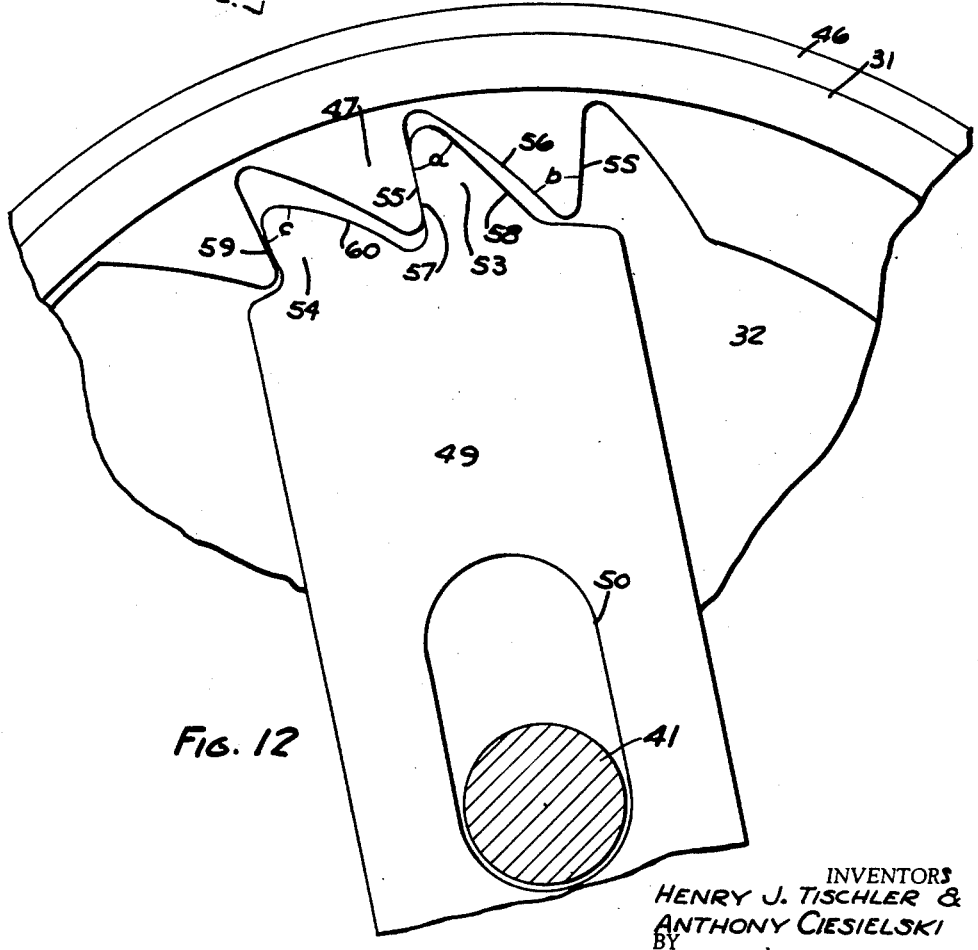
Fig. 12 is a fragmentary view of the parts shown in Fig. 3 on a greatly enlarged scale with the parts in a different position.

As shown in Fig. 12 each tooth 47 has a generally flat radial surface 55 and an inclined concave surface 56. The teeth 48 of the opposite set are similarly shaped. Each tooth 53 of the pawl 49 includes a complementary flat radial surface 57 and an inclined flat surface 58. The included angle *a* which the radial surface 57 makes with the inclined surface 58 of the pawl is smaller than the included angle *b* which the radial surface 55 makes with the inclined surface 56 of the set of teeth 47. Tooth 54 of pawl 49 is shorter than tooth 53 and includes a generally radial convex surface 59 and an inclined convex surface 60, the included angle *c* between surfaces 59 and 60 being greater than the included angle *b* or the included angle *a*. The convex surface 59 of tooth 54 is inclined slightly, at an angle of about 5°, from a radial plane and in the direction toward the adjacent tooth 53 (Fig. 12) to facilitate engagement and disengagement of the pawl 49 with the sets of teeth 47, 48.

As shown in Fig. 3 the surfaces 56 of the diametrically opposed sets of teeth incline radially outwardly and circumferentially in a direction opposite to the direction in which the back frame 24 moves from the upright to the several reclining positions. As pointed out previously and shown in Fig. 3 the teeth 47 are displaced angularly or circumferentially relative to the teeth 48 so that when the pawl is moved out of engagement with one set of teeth and into engagement with the other set of teeth the casing 31 will move angularly under the weight of the back frame 24 to a new position. For example, when the pawl 49 in Fig. 3 is moved upwardly the upper tooth 53 of the pawl is moved into a space between a pair of teeth 47 and when the lower tooth 53 of the pawl disengages from the tooth 48, casing 32 together with back frame 24 will rotate in the direction of the arrow to bring radial surface 57 of the upper tooth 53 into contact with radial surface 55 of one of the teeth 47. In the uppermost position of the seat back, and the succeeding three adjusted positions, a tooth 54 on the pawl contacts the radial surface of an adjacent tooth on the casing, thus distributing the load on two teeth instead of one. In the fifth adjusted position of the seat back only a tooth 53 is engaged with a tooth 47 and in the sixth position of the seat back only a tooth 53 is engaged with a tooth 48.

Figure 2:
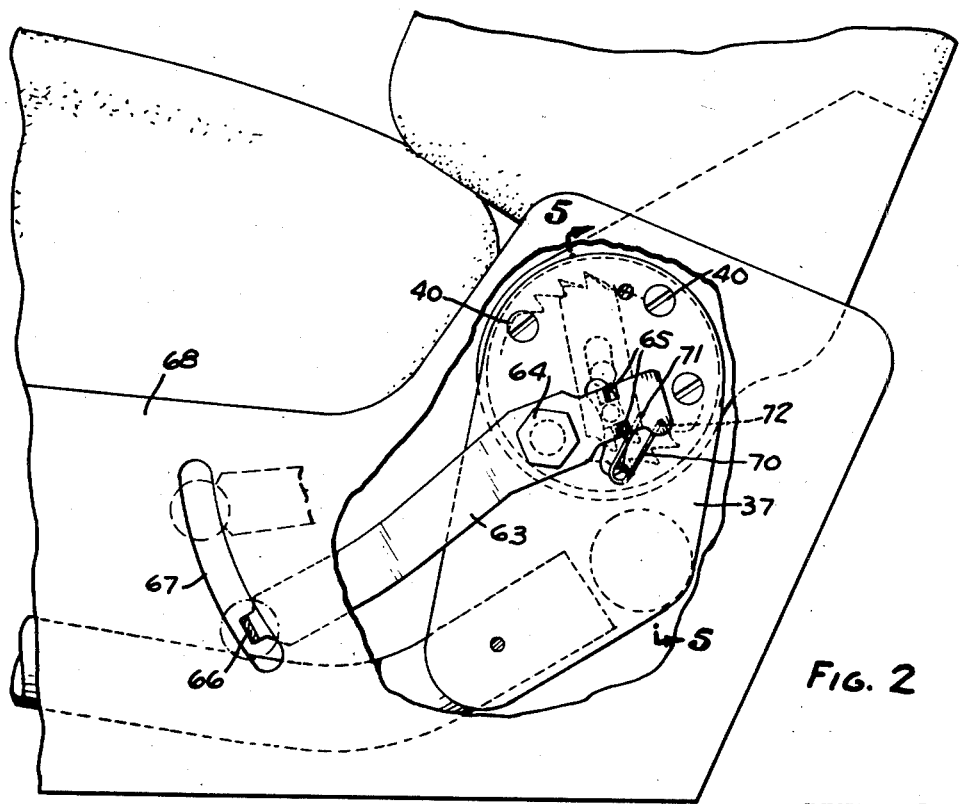
Fig. 2 is a fragmentary view on a greatly enlarged scale of one end of the seat shown in Fig. 1, parts being broken away.

Means are provided for manually reciprocating the pawl 49 and include slots 61 through bearing plate 36 and bracket 37 through which a pin 62 on pawl 49 projects. As shown in Figs. 2, 5 and 8 a lever 63 is pivoted to upright bracket 37 on the seat frame by means of a bolt 64. Lugs 65 bent inwardly from one end of the lever are adapted to engage the pin 62 on pawl 49 so that when the lever is actuated the pin 62 is moved upwardly and downwardly as shown in Fig. 2 to reciprocate the pawl 49. The other end of lever 63 is bent outwardly as at 66 through an opening 67 in protective cover 68. A knob 69 is mounted on the end of the lever to provide a means for grasping the lever 63 in order to move it. A hairpin spring 70 is provided to yieldingly urge the pawl into engagement with each of the sets of teeth. Spring 70 comprises a loop of wire with projecting arms, one arm being engaged with the end of the lever 63 as at 71 and the other arm being engaged with the bracket 37 as at 72. At the lever 63 is moved, the point 71 on the lever 63 is moved from one side of a center line connecting point 72 and the axis of bolt 64 to the other side so that the spring passes over center to yieldingly urge the lever in each of its positions and, in turn, yieldingly urge the pawl into engagement with each of the sets of teeth.

Figure 6:
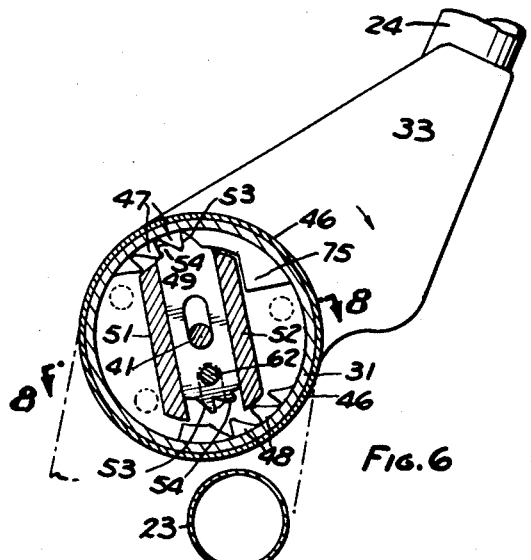
Fig. 6 is a fragmentary sectional view similar to Fig. 3, showing the parts in a different position and on a reduced scale.
Figure 11:
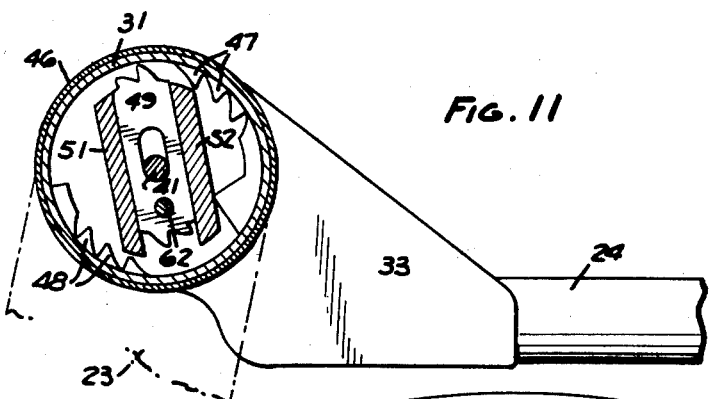
Fig. 11 is a fragmentary sectional view similar to Figs. 6 and 7, showing the parts in a still further position.

When the back frame 24 is in its uppermost or generally vertical position the parts of the adjusting mechanism 30 are positioned as shown in Fig. 6. Tooth 53 and tooth 54 of pawl 49 are engaged with teeth 47. When the lever 63 is actuated to move pawl 49 downwardly the lower tooth 53 of the pawl 49 moves into the space between teeth 48 and thereafter the upper tooth 53 moves out of engagement with the upper set of teeth 47 permitting the back frame 24 to move under its own weight in a clockwise direction as shown in Fig. 6 to a new position. The movement of the seat frame more than a predetermined amount is prevented by the contact of one of the teeth 48 with tooth 53 and tooth 54 on the lower end of the pawl. When the lever 63 is again actuated to raise the pawl another stepped movement of the back frame 24 is produced. Successive movement of the lever causes successive movement of the back frame until the back frame is in the lowered position shown in Fig. 11 with the pawl out of engagement with any of the teeth. In this position the back frame is normally supported by a bracket or other support on the floor of the automobile.

In order to elevate back frame 24 it is only necessary to grasp the back frame and move it manually upwardly. This movement will cause the pawl to be reciprocated back and forth under the action of teeth 47, 48 on the pawl. Specifically, the inclined surfaces 56 of teeth 47, 48 act on the teeth 53 to cause the reciprocation of the pawl. By this arrangement the back frame will be elevated in one continuous movement. Upward movement of the back frame is limited to the position shown in Fig. 6 by contact of a stop 75 with guide rail 52 as shown in Fig. 6.

In the operation of the seat-adjusting mechanism it has been found that the convex surfaces 56 on the teeth 47, 48 prevent locking or binding of the pawl 49 when the back is elevated. By this arrangement when the back is moved upwardly toward an upright position there is no undesirable locking friction between the end of teeth 53 and the inclined surface 56 of the teeth 47, 48 and the pawl reciprocates freely between the sets of teeth.

A modified form of pawl-actuating mechanism is shown in Fig. 14 wherein the operating lever 63 is replaced by a crank 76 pivoted to plate 37. The end of crank 76 is connected to the shaft 77 of a double-acting solenoid 78 by means of a link 79. The double-acting solenoid 78 is controlled by a manually operable switch 80 so that upon manipulation of the switch the crank 76 is successively moved in opposite directions. By this arrangement each time the switch 80 is operated the crank 76 is moved either in one direction or another to move the pawl 49 either upwardly or downwardly.

It can thus be seen that the resulting reclining seat not only can be readily adjusted, but in addition the adjusting mechanism is compact and sufficiently protected so that it will not be damaged by the normal wear and tear imposed on the seat by persons entering and leaving the automobile. In addition, the reclining seat mechanism may be manufactured at low cost.

Because the hinge line of the back frame which passes through inner pin 26 and outer pin 41 is located near the end of the seat frame, it is possible to obtain a relatively flat unit when the seat back is in its lowermost position.

We claim:

1. In a reclining seat, the combination comprising a seat frame, a back frame, means for hinging said back frame to said seat frame for movement of said back frame from a generally vertical position to a generally horizontal position rearwardly of said seat frame, and a seat-adjusting mechanism at one end of said seat frame and back frame comprising diametrically opposed sets of teeth on said back frame on opposite sides of the hinge axis of said back frame to said seat frame, a unitary pawl mounted on said seat frame and having opposed portions thereof provided with teeth for engaging said diametrically opposed sets of teeth on the back frame, means for mounting said pawl for reciprocating movement on said seat frame between said opposed sets of teeth, and means on said seat frame for reciprocating said pawl to simultaneously shift both opposed portions in the same direction, the length of said pawl measured between the teeth at said opposed portions being such that when the pawl is reciprocated from engagement with one set of teeth toward engagement with the other set of teeth, said pawl is in position to engage said other set of teeth before it is disengaged with the first set of teeth, whereby the position of said back frame relative to said seat frame may be adjusted in step-by-step fashion by reciprocating said pawl, said back frame being adjusted by one step relative to said seat frame on each reciprocation of said pawl.

2. The combination set forth in claim 1 wherein said means for hinging said back frame to said seat frame includes a pin on one of said frames and a complementary opening for said pin on the other of said frames.

3. The combination set forth in claim 2 wherein said pin is mounted on said back frame.

4. The combination set forth in claim 1 wherein said means for hinging said back frame to said seat frame comprises a plate mounted on said seat frame and a hollow cylindrical casing on the back frame, the periphery of said plate engaging the inner surface of said cylindrical casing to form a bearing.

5. In a reclining seat, the combination comprising a seat frame, a back frame, means at each end of said back frame for pivotally connecting said back frame to said seat frame, and an adjusting mechanism adjacent one end of said back frame for adjusting the position of said back frame relative to said seat frame comprising diametrically opposed sets of teeth on said back frame on opposite sides of the pivoted axis of said back frame to said seat frame, the apexes of said teeth extending radially inwardly and lying on a common circle having the pivotal axis of the back frame to the seat frame as its center, a unitary pawl, means for mounting said pawl on said seat frame for rectilinear movement, said pawl having a tooth at each end thereof adapted to engage the diametrically opposed sets of teeth, the length of said pawl measured along a line parallel to its reciprocating movement thereof being greater than the diameter of the circle in which the apexes of the diametrically opposed sets of teeth lie, the circumferential positions of said sets of teeth relative to the line of movement of said pawl being such that as the pawl is reciprocated and the tooth on one end of said pawl is moved out of engagement with one set of teeth the tooth on the other end of said pawl is moved into a space between the teeth in the other set of teeth, whereby the position of said back frame to said seat frame may be adjusted by reciprocating said pawl between said diametrically opposed sets of teeth, said back frame being adjusted by increments on each movement of the pawl in one direction.

6. The combination set forth in claim 5 wherein each said tooth in said diametrically opposed sets of teeth includes a generally flat radially extending surface and a surface inclined thereto, said pawl having a tooth including a complementary radially extending flat surface and a surface inclined thereto, whereby the back frame may be lowered step-by step under its own weight by reciprocation of said pawl and the back frame may be elevated in one continuous movement by grasping said back frame and lifting it.

7. The combination set forth in claim 6 wherein the included angle between the inclined and radially extending surfaces on each said tooth on said pawl is smaller than the included angle between the inclined and radially extending surfaces of each said tooth in said diametrically opposed sets of teeth.

8. The combination set forth in claim 7 wherein said inclined surface of said tooth in said diametrically opposed sets of teeth is concave and said inclined surface of said tooth on said pawl is generally flat.

9. The combination set forth in claim 5 including a second tooth on each end of the pawl, said second tooth having a lesser height than said first tooth and provided with a convex generally radial surface for engaging the flat radial surfaces on said diametrically opposed sets of teeth.

10. In a reclining seat, the combination comprising a seat frame, a back frame, means for hinging one end of the back frame to the seat frame, and a combined hinging and adjusting mechanism at the other end of said back frame comprising a cylindrical casing mounted on said back frame, a bearing plate mounted on said seat frame and having a portion engaging the periphery of said cylindrical casing thereby forming a pivotal connection for said back frame to said seat frame, diametrically opposed sets of teeth on the inner periphery of said cylindrical casing, the apexes of said teeth lying on a common circle, a unitary pawl on said bearing plate, guide means on said bearing plate for guiding said pawl for reciprocating movement in a path generally diametrically of said cylindrical casing, at least one tooth on each end of the pawl, the length of said pawl measured along a line parallel to its line of movement being greater than the diameter of the apex circle of said diametrically opposed sets of teeth, and means on said seat frame for reciprocating said pawl, the circumferential positions of said sets of teeth relative to the line of movement of said pawl being such that as the pawl is reciprocated and the tooth on one end of said pawl is moved out of engagement with one set of teeth the tooth on the other end of said pawl is moved into a space between the teeth in the other set of teeth, whereby when said pawl is reciprocated from engagement with one set of teeth into engagement with the other set of teeth the back frame is permitted to move downwardly in step-by-step fashion under its own weight to a lower position.

11. In a reclining seat, the combination comprising a seat frame, a back frame, means for hinging one end of the back frame to the seat frame, and a combined hinging and adjusting mechanism at the other end of said back frame comprising a cylindrical casing mounted on said back frame, a bearing plate mounted on said seat frame and having a portion engaging the periphery of said cylindrical casing thereby forming a pivotal connection for said back frame to said seat frame, diametrically opposed sets of teeth on the inner periphery of said cylindrical casing, the apexes of said teeth lying on a common circle, a unitary pawl on said bearing plate, guide means on said bearing plate for guiding said pawl for reciprocating movement in a path generally diametrically of said cylindrical casing, at least one tooth on each end of the pawl, the length of said pawl measured along a line parallel to its line of movement being greater than the diameter of the apex circle of said diametrically opposed sets of teeth, and means on said seat frame for reciprocating said pawl, the circumferential positions of said sets of teeth relative to the line of movement of said pawl being such that as the pawl is reciprocated and the tooth on one end of said pawl is moved out of engagement with one set of teeth the tooth on the other end of said pawl is moved into a space between the teeth in the other set of teeth, whereby when said pawl is reciprocated from engagement with one set of teeth into engagement with the other set of teeth the back frame is permitted to move downwardly under its own weight to a lower position, each said tooth in said diametrically opposed sets of teeth comprising a radial surface and an inclined surface, said tooth on each end of said pawl comprising a generally complementary radial surface and a generally complementary inclined surface.

12. The combination set forth in claim 11 wherein the angle which said inclined surface of said tooth on said pawl makes with the radial surface thereof is less than the angle which said inclined surface of said tooth in said diametrically opposed sets of teeth makes with the radial surface thereof.

13. The combination set forth in claim 11 wherein said means for guiding said pawl includes spaced rails mounted on the bearing plate on each side of said pawl.

14. In a reclining seat, the combination comprising a seat frame, a back frame, means for pivotally connecting said back frame to said seat frame, and a seat adjusting mechanism comprising diametrically opposed sets of teeth on one of said frames on opposite sides of the hinge axis of said back frame to said seat frame, a unitary pawl mounted on the other of said frames for reciprocating movement in a straight path parallel to a line extending diametrically between said two sets of teeth, means for guiding said pawl in said reciprocating movement, said pawl having teeth formed on the opposite ends thereof, and means for reciprocating said pawl, the maximum length of said pawl measured between the apexes of said teeth at the opposite ends thereof being greater than the distance between the apexes of the opposed sets of teeth, the circumferential relationship of said opposed sets of teeth being such that when the pawl is reciprocated from engagement with one set of teeth toward engagement with the other set of teeth, the pawl is in position to engage said other set of teeth before it is disengaged with the first set of teeth, so that the position of the back frame relative to the seat frame may be adjusted in step-by-step fashion by reciprocating the pawl.

15. The combination set forth in claim 14 wherein said seat adjusting mechanism is provided at one end of said seat frame and back frame.

16. The combination set forth in claim 14 including an over-center spring for yieldingly urging said pawl into engagement with each of said sets of teeth.

17. The combination set forth in claim 14 including an arm pivotally connected to said seat frame, means forming an operative connection between said arm and said pawl, said spring having one end thereof connected to said arm and the other end thereof connected to said seat frame, a spring being constructed and arranged to pass over center as the pawl is reciprocated from engagement with one set of teeth into engagement with another set of teeth.

18. The combination set forth in claim 9 wherein said second tooth on each end of the pawl is provided with an inclined convex surface forming an included angle with the convex generally radial surface thereof which is greater than the included angle between the inclined surface on each said first tooth on said pawl with the flat surface of each said first tooth on said pawl and greater than the included angle between the inclined surface of each said tooth in said diametrically opposed sets of teeth and the radial surface of each said tooth of said sets of teeth.

References Cited in the file of this patent

UNITED STATES PATENTS

| | | |
|---|---|---|
| 463,385 | Griffin | Nov. 17, 1891 |
| 539,624 | Lafore | May 21, 1895 |
| 1,846,548 | Ganoung et al. | Feb. 23, 1932 |
| 2,216,822 | Lloyd | Oct. 8, 1940 |